United States Patent [19]

Shimomura et al.

[11] Patent Number: 4,687,383
[45] Date of Patent: Aug. 18, 1987

[54] INSERT ROTARY CUTTER

[75] Inventors: Hiroshi Shimomura, Nakano; Tatsuo Arai, Kitamoto, both of Japan

[73] Assignee: Mitsubishi Kinzoku Kabushiki Kaisha, Tokyo, Japan

[21] Appl. No.: 845,866

[22] Filed: Mar. 28, 1986

[30] Foreign Application Priority Data

Mar. 30, 1985 [JP] Japan .................................. 60-67203
Aug. 7, 1985 [JP] Japan ................................ 60-123894

[51] Int. Cl.$^4$ .............................................. B23C 5/22
[52] U.S. Cl. ....................................... 407/46; 407/41; 407/49; 407/113; 407/119
[58] Field of Search ....................... 407/36, 37, 41, 46, 407/42, 49, 99, 101, 113, 119

[56] References Cited

U.S. PATENT DOCUMENTS

| | | | |
|---|---|---|---|
| 3,116,538 | 1/1964 | Severson | 407/41 |
| 3,217,384 | 11/1965 | Wirfelt | 407/46 |
| 3,391,438 | 7/1968 | Milewski | 407/46 |
| 3,546,758 | 12/1970 | Stier | 407/101 |
| 3,559,261 | 2/1971 | Greenleaf | 407/46 |
| 3,739,442 | 6/1973 | Lovendahl | 407/113 |
| 3,757,397 | 9/1973 | Lindsay | 407/41 |
| 3,934,319 | 1/1976 | Schuler | 407/113 |
| 4,303,358 | 12/1981 | Grusa | 407/46 |
| 4,600,341 | 7/1986 | Board | 407/99 |

*Primary Examiner*—Nicholas P. Godici
*Assistant Examiner*—Jerry Kearns
*Attorney, Agent, or Firm*—Cushman, Darby & Cushman

[57] ABSTRACT

An insert rotary cutter incldues a cutter body having an axis of rotation therethrough. The cutter body has a plurality of pockets formed in one end thereof in circumferentially distributed relation. A plurality of support members are attached respectively to the pockets. Each of the support members has a recess being open radially and axially outwardly of the cutter body. A plurality of polygonal cutter inserts are positioned respectively in the recesses. The recesses have a depth of one third to two thirds of a thickness of the cutter insert. A plurality of clamp wedges respectively clamp the cutter inserts to the cutter body through the support members.

3 Claims, 26 Drawing Figures

INSERT ROTARY CUTTER

BACKGROUND OF THE INVENTION

1. Field of the Invention

This invention relates to an insert rotary cutter having a plurality of indexable cutter inserts attached thereto through respective support members.

2. Prior Art

One conventional insert rotary cutter for processing a surface of a metal workpiece includes a cutter body having a plurality of pockets formed in one end in circumferentially distributed relation and a plurality of indexable cutter inserts attached respectively to the pockets through support members of hard wear resistant metal interposed therebetween. It is appreciated that the insert rotary cutter of this type possesses such advantages that the cutter body is not subject to wear or abrasion, and that, even if the cutter inserts suffer from damage, the support members prevent the cutter body from being damaged and at most an exchange of the inserts and the support members is simply required to restore the damaged cutter. Since the support members have complicated shapes and are to be manufactured with high precision, precision cast steel hardened by heat treatment is conventionally utilized to manufacture them. In addition, the conventional support members include recesses to respectively accommodate the inserts, each recess having a depth generally equivalent to the thickness of the cutter inserts.

Incidentally, in order to reduce the cost of processing workpieces, there is a tendency in the operation of machine tools to perform a heavy-duty processing at a high feed rate with rotary cutters having cutter inserts of small sizes, so that a reliable cutter having a high performance is required. To meet these requirements, it is essential to employ the support members which are not subject to wear or abrasion over a prolonged period of time. In this respect, since the support members in the rotary cutter mentioned above are made of cast steel, in the case of the heavy-duty processing, burrs or wear develop in the support members and the rotary cutter becomes low endurability.

We have, therefore, made an extended study over the improvement of the cutter of the above-mentioned type and tackled especially on whether it is possible to form the support members of a powdered sintered material, particularly of cemented carbide, cermet, ceramics or high speed steel by means of extrusion molding which is advantageous with regards to manufacturing cost.

However, it has been proved that when forming the support members by the molding, if the same depth as that of the recess of the conventional support member is given to the recess of the support member under consideration, a thickness thereof should be made unnecessarily large, so that it is impossible to impart compactness to the rotary cutter. That is to say, in the molding, if a work member to be constructed has a recess to be shaped, the thickness of the work member is to be preferably selected as more than three times a depth of the recess thereof, so that the member has to be unnecessarily thick.

SUMMARY OF THE INVENTION

It is therefore an object of this invention to provide an insert rotary cutter which is compact and possesses excellent durability.

According to the present invention, there is provided an insert rotary cutter comprising a cutter body having an axis of rotation therethrough, the cutter body having a plurality of pockets formed in one end thereof in circumferentially distributed relation, a plurality of support members attached respectively to the pockets, each of the support members having a recess being open radially and axially outwardly of the cutter body, a plurality of polygonal cutter inserts positioned respectively in the recesses, the recesses having a depth of one third to two thirds of a thickness of the cutter insert, and a plurality of clamp means to respectively clamp the cutter inserts to the cutter body through the support members.

DESCRIPTION OF PREFERRED EMBODIMENT OF THE INVENTION

Referring to FIGS. 1 to 5, the insert rotary cutter according to the present invention comprises a cutter body 10 including a base portion 11 of a circular cross-section having a forward end face 12, a rearward end face 13 and a circumferential surface 14 lying between the forward and rearward end faces 12 and 13. The cutter body 10 also includes a spindle end 15 of a circular cross-section extending coaxially from the base portion 11 at rearward end face 13. The forward end face 12 is disposed in a plane perpendicular to an axis of rotation of the cutter body 10. The spindle end 15 is suitably adapted for a conventional machine spindle (not shown).

The base portion 11 of the cutter body 10 has a plurality of generally radially outwardly-opening pockets 16 formed in the circumferential surface 14 in circumferentially-spaced relation to each other and disposed adjacent to the forward end face 12. Each of the pockets 16 has a generally channel-shaped cross-section defined by a pair of circumferentially-facing opposed first and second side walls 17 and 18 and a bottom wall 19 interconnecting the first and second side walls 17 and 18 at their inner ends, the pocket 16 extending rearwardly from the forward end face 12. The first and second side walls 17 and 18 are inclined circumferentially of the cutter body 10. The bottom wall 19 of the pocket 16 is also disposed in a plane generally along the axis mentioned above, and defines a first bottom wall face 19a disposed generally perpendicularly to the first side wall 17 adjacent thereto and a second bottom wall face 19b stepped inwardly from the first bottom wall face 19a. The pocket 16 also has a rearward wall 20 interconnecting the first and second side walls 17 and 18 and the bottom wall 19 and disposed generally perpendicularly thereto. Each of the pockets 16 receives a cutter insert 21 through a support member 22 interposed therebetween.

Figures 1, 3:
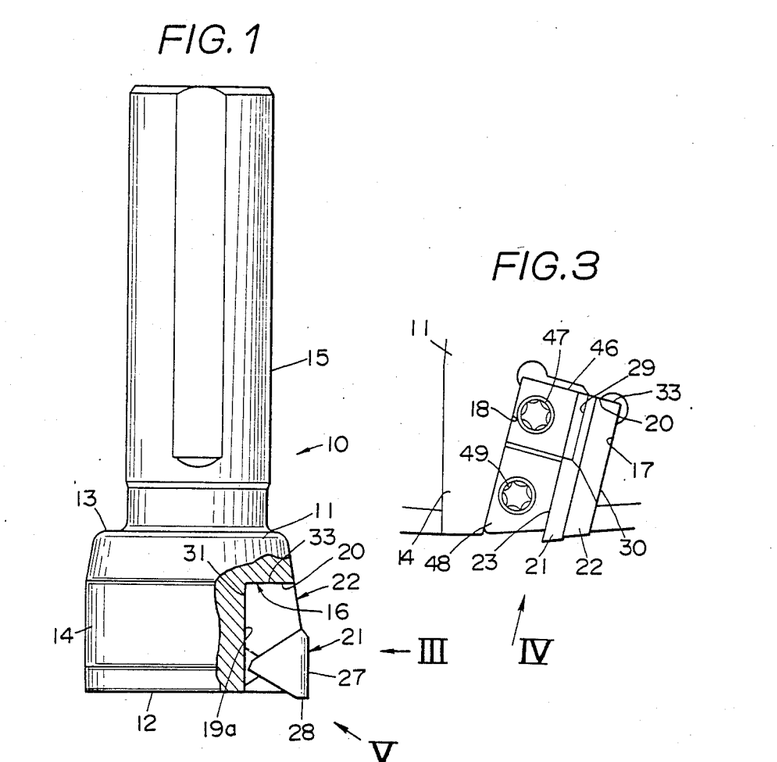
FIG. 1 is a partial cutaway side-elevational view of an insert rotary cutter in accordance with a first embodiment of the present invention.
FIG. 3 is a view seen in the direction indicated by arrow III of FIG. 1.
Figure 2:
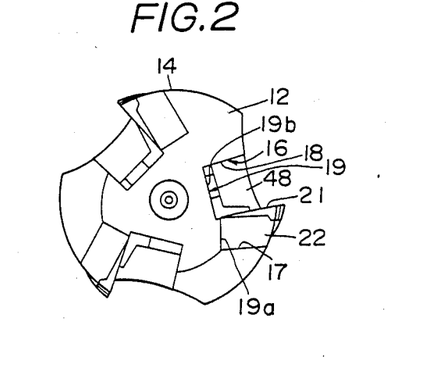
FIG. 2 is an end view of the insert rotary cutter.
Figure 4:
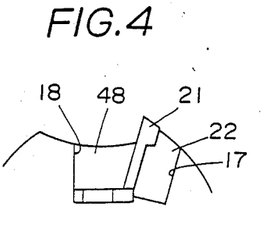
FIG. 4 is a view seen in the direction indicated by arrow IV of FIG. 3.
Figure 5:
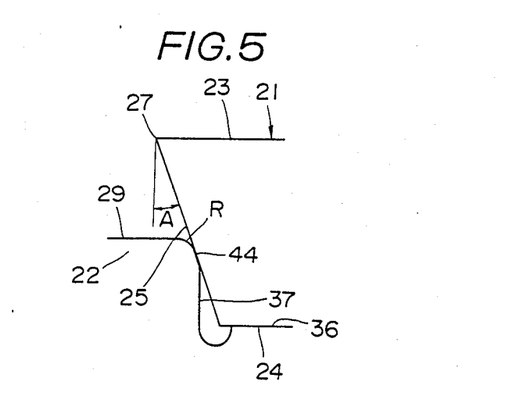
FIG. 5 is a view seen in the direction indicated by arrow V of FIG. 1.
Figure 6:
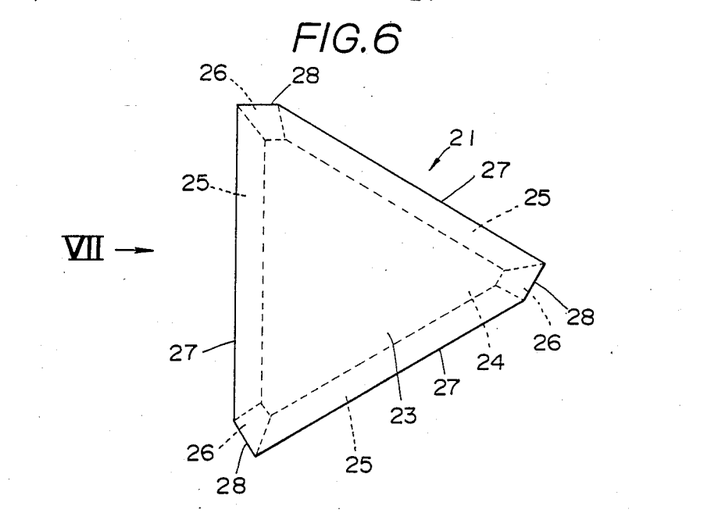
FIG. 6 is a plan view of a triangular cutter insert employed in the insert rotary cutter.
Figure 7:
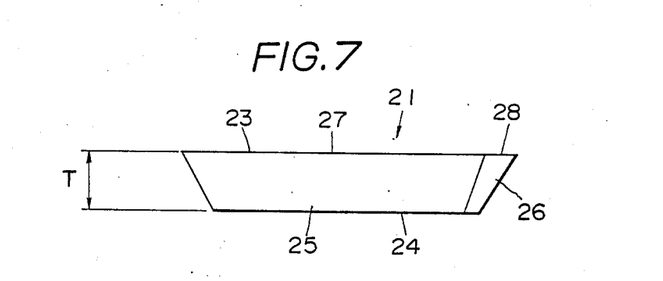
FIG. 7 is a view seen in the direction indicated by arrow VII of FIG. 6.
Figure 8:
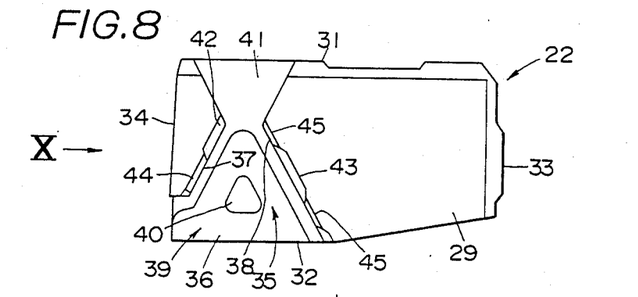
FIG. 8 is a plan view of a support member to be attached to a cutter body of the insert rotary cutter.
Figure 9:
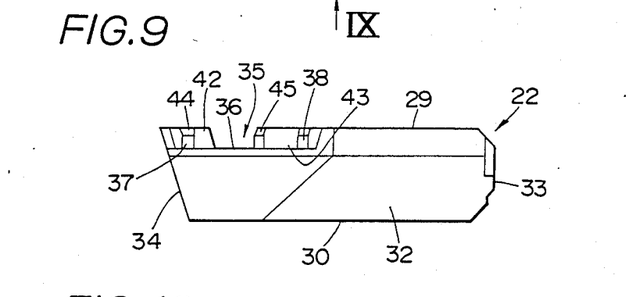
FIG. 9 is a view seen in the direction indicated by arrow IX of FIG. 8.
Figure 10:
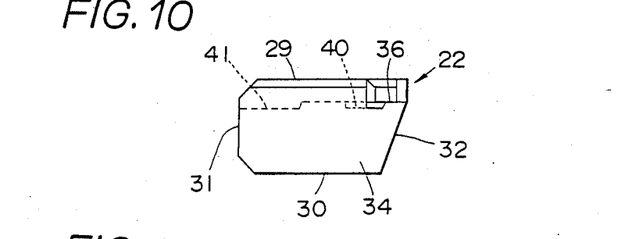
FIG. 10 is a view seen in the direction indicated by arrow X of FIG. 8.
Figure 11:
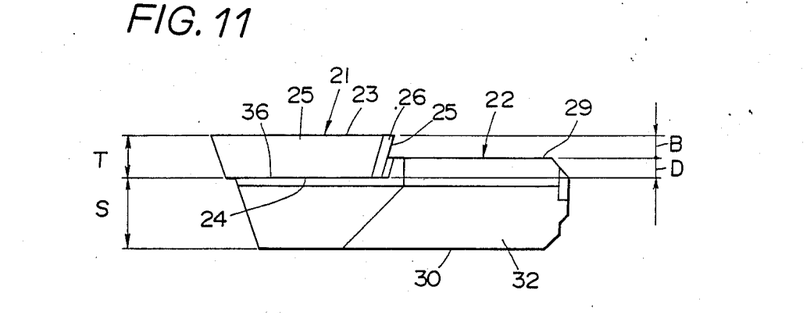
FIG. 11 is a view similar to FIG. 9, but showing the support member having a cutter insert attached thereto.

The cutter insert 21, as shown more in detail in FIGS. 6 and 7, comprises a generally triangular plate of a uniform thickness T defined by a flat front face 23, a flat rear face 24 disposed parallel to the front face 23, and three flat side faces 25. The cutter insert 21 is preferably made of a sintered hard material such as cemented carbide. Each of the side faces 25 is sloping inwardly in a direction away from the front face 23. Three corners of the insert 21 are removed to provide three corner faces 26, each of the corner faces 26 being sloping inwardly in a direction away from the front face 23. The cutter insert 21 has three main cutting edges 27 each defined by the front face 23 and a respective one of the side faces 25, and three auxiliary cutting edges 28 each defined by the front face 23 and a respective one of the corner faces 26. Each side face 25 serves as a relief surface of a respective one of the main cutting edges 27 with a relief angle A, as shown in FIG. 5, and each corner face 26 also serves as a relief surface of a respective one of the auxiliary cutting edges 28. That portion of the front face 23 disposed adjacent to and extending along a respective one of the main cutting edges 27 and the auxiliary cutting edges 28 serves as a rake surface.

Figure 12:
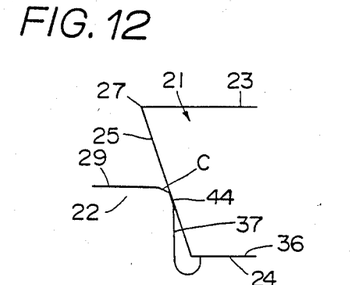
FIG. 12 is a view similar to FIG. 5, but showing a modified side wall of a recess of the support member.

The support member 22 has a generally hexahedral shape, as shown in FIGS. 8 to 11, defined by a pair of parallel front and rear faces 29 and 30, a pair of generally parallel longer side faces 31 and 32 and a pair of generally parallel shorter side faces 33 and 34. The support member 21 is made by molding of a powdered sintered material such as cemented carbide, cermet or ceramics, and includes a recess 35 formed in the front face 29 for receiving the cutter insert 21. The recess 35 is defined by a bottom face 36 and a pair of opposed first and second side walls 37 and 38, the bottom face 36 being disposed generally parallel to the front and rear faces 29 and 30 and being stepped down a predetermined depth D from the front face 29, where the depth D is to be so selected as to be in the range of one third to two thirds of the thickness T of the cutter insert 21, preferably not more than one half of the thickness T, and to be not more than one third of a thickness S of the portion of the support member 22 in which portion the recess 35 is formed. The first and second side walls 37 and 38 are disposed perpendicularly to the bottom face 36 and extend along the shorter side faces 33 and 34 to shape a portion of the bottom face 36 into a generally triangular shape which serves as an insert receiving face 39. The bottom face 36 has a clearance portions 40 and 41 therein, and the first and second side walls 37 and 38 have also respective clearance portions 42 and 43 therein. Those corner portions defined by the front face 29 and the first and second side walls 37 and 38 are removed to provide respectively positioning surfaces 44 and 45 which are sloping at the same angles as the relief angles A of the main cutting edges 27 of the cutter insert 21 with respect to the first and second side walls 37 and 38, the positioning surfaces 44 and 45 being adapted to engage the two adjacent side faces 25 of the cutter insert 21, respectively. The top edges of the positioning surfaces 44 and 45 are, as shown in FIG. 5, rounded off to provide rounded corners R, or, as shown in FIG. 12, chamfered to provide chamfered corners C. The rounded corners R or the chamfered corners C augment the strength of the positioning surfaces 44 and 45 against load exerted thereon.

Each of the support members 22 is received in a respective one of the pockets 16 in such a manner that one longer side face 31, the rear face 30 and one shorter side face 33 are held in contact with the first bottom wall face 19a of the bottom wall 19, the first side wall 17 and the rearward wall 20, respectively, that the remaining longer side face 32 and shorter side face 34 are disposed on a plane defined by the circumferential surface 14 of the base portion 11 and on a plane defined by the forward end face 12 thereof, respectively, and hence that each of the recesses 35 is open radially outwardly and axially forwardly of the cutter body 10. Then, the support member 22 is replaceably held in position by a clamp wedge 46 which is received in the pocket 16 and secured thereto through a screw 47 threaded thereinto, one of the sides of the clamp wedge 46 being held in abutment with the front face 29.

Each of the cutter inserts 21 is positioned in a respective one of the recesses 35 of the support members 22 in such a manner that the rear face 24 and the two adjacent side faces 25 of the cutter insert 21 are held in contact with the insert receiving face 39 of the bottom face 36 of the recess 35 and the positioning surfaces 44 and 45 of the first and second side walls 37 and 38 thereof, respectively. Then, the cutter insert 21 is held in position by a clamp wedge 48 which is received in the pocket 16 and secured thereto through a screw 49 threaded thereinto, one of the sides of the clamp wedge 48 being held in abutment with the front face 23 of the cutter insert 21, the other adjacent to one side of the clamp wedge 46 for the support member 22. In this condition, one of the main cutting edges 27 is disposed slightly beyond the circumferential surface 14 axially of the cutter body 10, serving as a peripheral cutting edge, and one of the auxiliary cutting edges 28 is located in a plane perpendicular to the axis of rotation of the cutter body 10 and slightly beyond the forward end face 12, serving as an end cutting edge. The peripheral and end cutting edges are disposed in a positive radial and axial rake plane.

As described above, inasmuch as each of the support members 22 has the recess 35 having the depth D of one third to two thirds of the thickness T of the cutter insert 21 and the depth D is not more than one third of the thickness S of the portion of the support member 22 in which portion the recess 35 is formed, it is possible not only to make the support member 22 of a powdered sintered material by extrusion molding but to keep it compact as well. Consequently, in addition to being compact, since little burr or abrasion develops in the support member 22 or the cutter body 10 over a prolonged period of time, the insert rotary cutter mentioned above has a high-performance and an excellent durability. Moreover, since the molding is employed to manufacture the support member 22, it is also possible to reduce the cost of manufacturing of the insert rotary cutter.

Furthermore, during the cutting operation, cutting loads consisting of principal force, feed force and back force exert on the respective one of the cutter inserts 21. Since the principal force is largest among these three, the cutter insert 21 is pressed against the bottom face 36 of the recess 35 of the support member 22, so that, although the recess 35 is relatively shallow, the cutter insert 21 is securely retained in the recess 35 of the support member 22. However, in order to maintain firm retention of the cutter insert 21 in the recess 35, the depth D of the recess 35 has to be, as mentioned above, not less than one third of the thickness T of the cutter insert 21. In addition, since the recess 35 is shallow, a distance B from the front face 23 of the cutter insert 21 to the top of the positioning surfaces 44 and 45 is great, so that, even if some cuttings are stuck to the main cutting edges 27 after the cutting operation, the cuttings stuck thereto do not cause the indexing error to occur when indexing the cutter insert 21 again.

Figure 13:
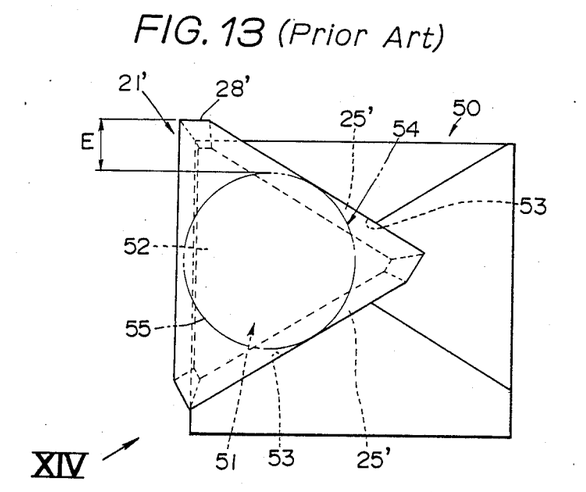
FIG. 13 is a plan view of a jig for determining the position of an auxiliary cutting edge of a conventional triangular cutter insert.
Figure 14:
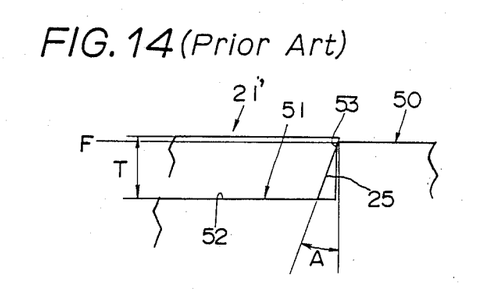
FIG. 14 is a view seen in the direction indicated by arrow XIV of FIG. 13.

In addition, in the embodiment mentioned above, each of the recesses 35 has the two positioning surfaces 44 and 45, so that the precision of positioning of the cutter insert 21 is maintained high. Moreover, although a large load is exerted on the two positioning surfaces 44 and 45, inasmuch as the recess 35 is shallow, the positioning surfaces 44 and 45 are scarcely subject to deformation such as warp. This is especially the case for the positioning surface 44 which is deposited in the first side wall 37 having a relatively small thickness. Incidentally, the cutter insert 21 for use in the insert rotary cutter should not be manufactured by a conventional method. To clarify this point, the conventional method is first explained with reference to FIGS. 13 and 14. To begin with, a triangular cutter insert blank 21' is formed of a sintered hard material. The cutter insert blank 21' includes a generally triangular plate defined by a front face, a rear face and three side faces 25', the corner portions of the plate where adjacent side faces 25' intersect one another being removed to provide respective corner faces, and each side face 25' constitutes the relief surface of respective one of the main cutting edges 27 of the cutter insert 21. Subsequently, the front and rear faces of the cutter insert blank 21' are machined so as to obtain a predetermined thickness thereof which is equivalent to the thickness T of the cutter insert 21 to be manufactured. Then, the cutter insert blank 21' is positioned in a jig or fixture 50 which has a recess 51 defined by a flat bottom face 52 and a pair of supporting surfaces 53, the recess 51 having the depth generally equivalent to the thickness T of the cutter insert 21. Two adjacent side faces 25' of a triangular cutter insert blank 21' are held in contact with the pair of supporting surfaces 53, respectively. In this condition, the corner of the triangular cutter insert blank 21', disposed adjacent to one of the side faces 25' and remote from the other thereof, is located or indexed in a machining position. This indexed corner of the insert blank 21' is machined to provide the auxiliary cutting edge 28'. A pin 54 of a circular cross-section is used to determine the position of the auxiliary cutting edge 28' to be formed. As shown in FIG. 13, the circumferential surface of the pin 54 serves as a nominal inscribed circle 55 to which the two supporting surfaces 53 of the jig 50 and hence the two adjacent side faces 25' of cutter insert blank 21' held against them are tangential. The position of the auxiliary cutting edge 28 is determined in such a manner that it is spaced a predetermined distance E from the nominal inscribed circle 55.

In this manner, the auxiliary cutting edge of the conventional cutter insert is formed, but a reference plane F, on which the side faces 25' of the cutter insert blank 21' actually engage the portions of the supporting surfaces 53 and the inscribed circle 55 exists, is spaced from a plane on which the auxiliary cutting edge 28' is positioned. In addition, it is inevitable that there exists a manufacturing dimensional error in the cutter insert 21, especially in the relief angles A thereof. Therefore, due to this error, the position of the auxiliary cutting edge 28' is liable to be inaccurate. However, since the plane on which the auxiliary cutting edge 28' is positioned, namely, the relief surface of the cutter insert blank 21' is very near to the reference plane F, the dimensional error can be practically negligible.

On the other hand, in the cutter insert 21 for use in the rotary cutter in accordance with the present invention, those portions of the side faces 25 remote from the relief surface are held in engagement with the positioning surfaces 44 and 45 of the recess 35, so that the manufacturing tolerance of the cutter insert 21' can not be neglected.

Figure 15:
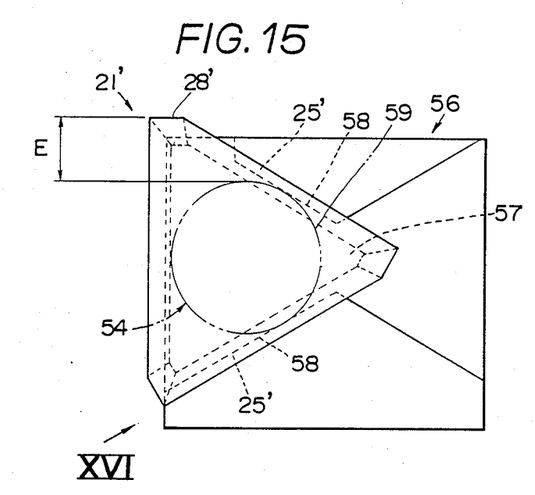
FIG. 15 is a view similar to FIG. 13, but showing a jig for determining the position of an auxiliary cutting edge of the cutter insert for the insert rotary cutter in accordance with the present invention.
Figure 16:
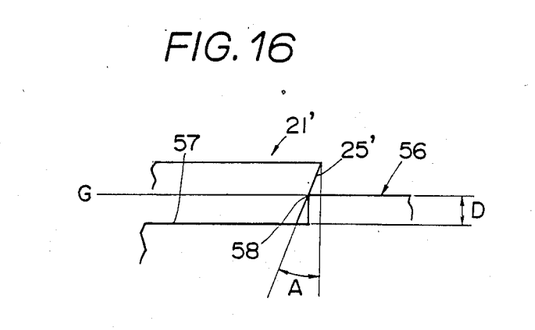
FIG. 16 is a view seen in the direction indicated by arrow XVI of FIG. 15.

Accordingly, another jig 56, which differs from the jig 50 only in that the depth of the recess 57 is the same as the depth D of the recess 35 of the support member 22 and two supporting surfaces 58 has a level equivalent to the level of the positioning surfaces 44 and 45 of the recess 35, is employed in the manufacture of the cutter insert 21 in accordance with the present invention. The method itself is quite similar to that mentioned above. The position of the auxiliary cutting edge 28' is determined based on a reference plane G on which the side faces 25' of the cutter insert blank 21' engage the portions of two supporting surfaces 58 of the jig 56 and a inscribed circle 59 exists. Since the depth of the recess 57 is the same as the depth D of the recess 35 of the support member 22, the side faces 25' of the cutter insert blank 21' are adapted to be actually held in engagement with the positioning surfaces 44 and 45 of the recess 35 of the support member 22 similarly on the reference plane G when the cutter insert blank 21' is positioned in the recess 35 thereof. Therefore, even if there exists the manufacturing dimensional error in the relief angles, the position of the auxiliary cutting edge 28' is accurately determined and the deviation thereof due to the error is minimized.

Figure 17:
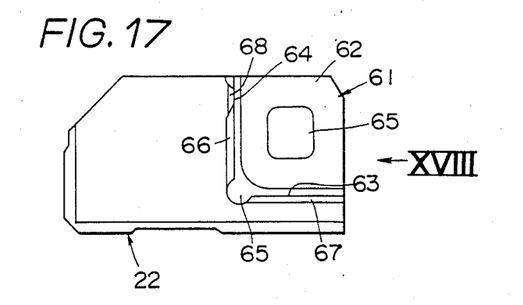
FIG. 17 is a view similar to FIG. 8, but showing a support member of a second embodiment of the rotary cutter.
Figure 18:
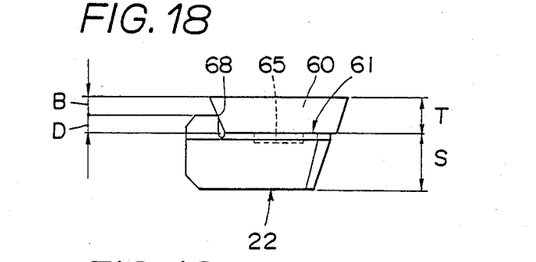
FIG. 18 is a view of the support member of the second embodiment with a cutter insert therein, seen in the direction indicated by arrow XVIII of FIG. 17.

FIGS. 17 and 18 show a second embodiment of the insert rotary cutter in accordance with the present invention, in which quadrilateral cutter inserts 60 are used and each of the support members 22 has a quadrilaterally-shaped recess 61. The recess 61 is defined by a bottom face 62 and a pair of first and second side walls 63 and 64, the bottom face 62 being stepped down the predetermined depth D from the front face of the support member 22, where the depth D is, similarly in the first embodiment, so selected as to be in the range of one third to two thirds of the thickness T of the cutter insert 60 and to be not more than one third of the thickness S of the portion of the support member 22 in which portion the recess 61 is formed. The recess 61 also includes clearance portions 65 and 66 in the bottom face 62 and the pair of first and second side walls 63 and 64, respectively, and positioning surfaces 67 and 68 in the top corner edges of the first and second side walls 63 and 64, respectively. In addition, the cutter insert 60 is positioned in the recess 61 in such a manner that a rear face and a pair of adjacent sides faces of the cutter insert 60 are held in contact with the bottom face 62 and the pair of supporting surfaces 63 and 64, respectively.

Figure 19:
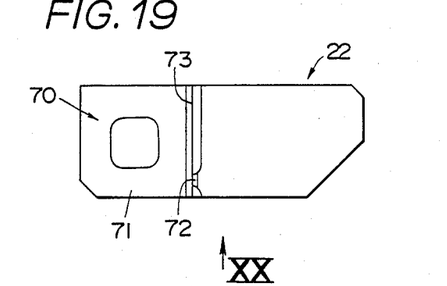
FIG. 19 is a view similar to FIG. 17, but showing a support member of a third embodiment of the rotary cutter.
Figure 20:
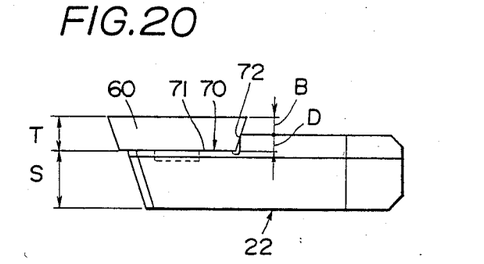
FIG. 20 is a view of the support member of the third embodiment with a cutter insert therein, seen in the direction indicated by arrow XX of FIG. 19.

FIGS. 19 and 20 show a third embodiment of the insert rotary cutter in accordance with the present invention, in which quadrilateral cutter inserts 60 are also used and a recess 70 of the support member 22 includes a quadrilateral shape having a bottom face 71 and one positioning surface 72 deposited in a side wall 73. The cutter insert 60 is positioned in the recess 70 in such a manner that the rear face and a side face of the cutter insert 60 are held in contact with the bottom face 71 and the positioning surface 72, respectively. The positioning surface 72 is for positioning of the cutter insert 60 axially of the cutter body. The positioning of the cutter insert 60 in the radial direction of the cutter body is performed directly by the cutter body or by a positioning member interposed therebetween.

Figure 21:
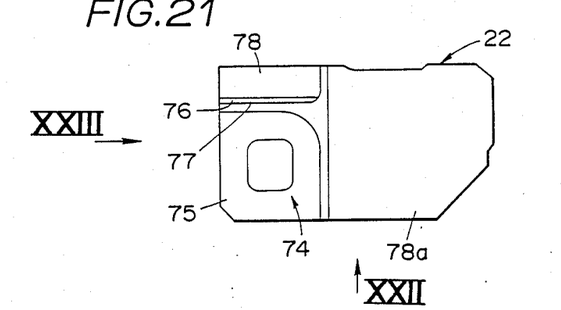
FIG. 21 is a view similar to FIG. 17, but showing a support member of a fourth embodiment of the rotary cutter.
Figure 22:
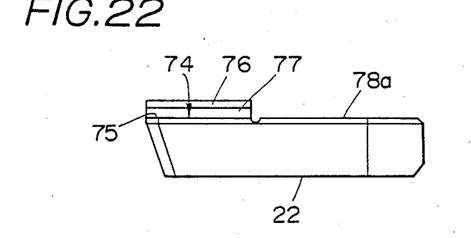
FIG. 22 is a view seen in the direction indicated by arrow XXII of FIG. 21.
Figure 23:
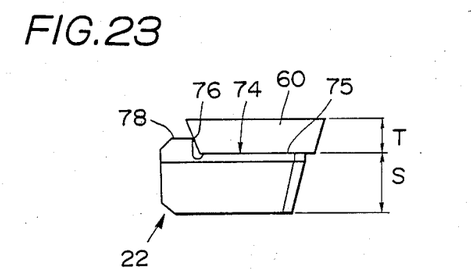
FIG. 23 is a view of the support member of the fourth embodiment with a cutter insert therein, seen in the direction indicated by arrow XXIII of FIG. 21.

FIGS. 21 to 23 show a fourth embodiment of the insert rotary cutter in accordance with the present invention, in which quadrilateral cutter inserts 60 are also used and a recess 74 of the support member 22 includes a bottom face 75 and one positioning surface 76 deposited in a side wall 77. The positioning surface 76 is for positioning the cutter insert 60 radially of the cutter body. The positioning of the cutter insert 60 in the axial direction is performed by a positioning member ( not shown ) deposited on the portion of the front face 78 of the support member 22, designated as 78a, the portion 78a being stepped down from the front face 78. Generally, the level of the portion 78a is preferably selected to be the same as the level of the bottom face 75 of the recess 74 or to be slightly lower than that.

Figure 24:
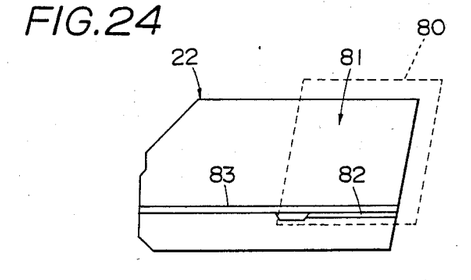
FIG. 24 is a view similar to FIG. 17, but showing a support member of a fifth embodiment of the rotary cutter.

FIG. 24 shows a fifth embodiment of the insert rotary cutter in accordance with the present invention, in which a rhombic cutter inserts 80 are used and a recess 81 of the support member 22 includes one positioning surface 82 deposited in a side wall 83 for positioning the cutter insert 80 radially of the cutter body. For positioning the cutter insert 80 in the axial direction, a positioning member ( not shown ) is employed.

It is needless to mention that also in the third to fifth embodiments the depth of each of the recesses is so selected as to be one third to two thirds of the thickness of the cutter insert and to be not more than one third of the thickness of the portion of the supporting member in which portion the recess is formed. Therefore, it becomes possible to make the support members by molding of a powdered sintered hard material and to keep them compact. As a result, it is possible to provide the insert rotary cutter which is compact and has an excellent durability.

Figure 25:
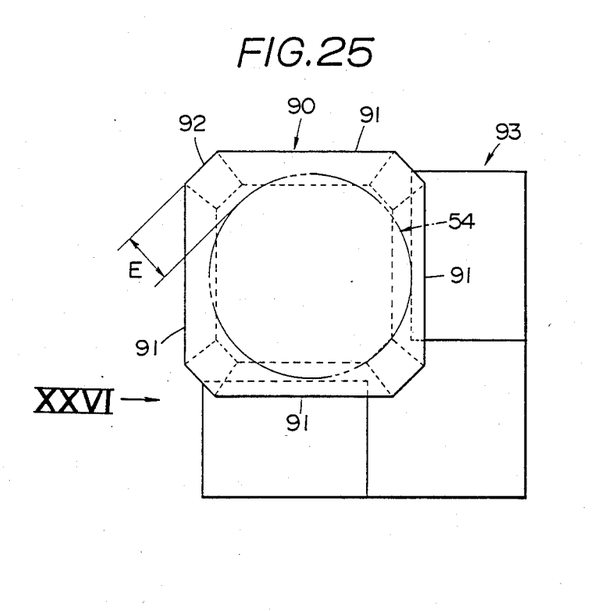
FIG. 25 is a plan view of a jig for determining the position of an auxiliary cutting edge of the quadrilateral cutter insert.
Figure 26:
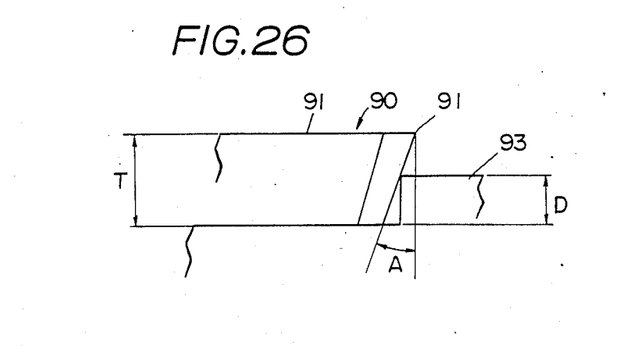
FIG. 26 is a view seen in the direction indicated by arrow XXVI of FIG. 25.

FIGS. 25 and 26 show a square cutter insert 90 having the main and auxiliary cutting edges 91 and 92 and a jig 93 used for forming the auxiliary cutting edge 91. By the jig 93, the auxiliary cutting edge 91 is shaped with high precision, similarly in the case of the triangular cutter insert 21 mentioned above.

While the invention has been particularly shown and described with reference to preferred embodiments thereof, it will be understood that various modifications may be made therein without departing from the spirit and scope of the invention.

What is claimed is:

1. An insert rotary cutter comprising:
   (a) a cutter body having an axis of rotation therethrough and a plurality of pockets formed in one end thereof in circumferentially distributed relation;
   (b) a plurality of support members of cemented carbide attached respectively to said pockets, each support member having a front face, a rear face and a recess formed in the front face thereof, said recess being open radially and axially outwardly of the cutter body and having a bottom face;
   (c) a plurality of cutter inserts each comprising a polygonally shaped plate defined by a front face, a rear face and a plurality of side faces, each cutter insert being received in a respective one of said recesses of the said support member with the rear face of the insert held in contact with the bottom face of the recess so as to have a positive rake in the radial and axial directions; and
   (d) a plurality of clamp means to respectively clamp said cutter inserts to said cutter body through said support members;

the depth of each said recess being one third to two thirds of a thickness of a said respective cutter insert, the thickness of said respective support member between said bottom face of said respective recess and said rear face of the support member being not less than three times the depth of said respective recess, said respective recess having at least one side wall disposed generally perpendicularly to said bottom face, said side wall of said respective recess having a positioning surface with which one of said side faces of said cutter insert is held in abutment for positioning the cutter insert, an edge portion defined by said positioning surface of said respective recess and said front face of said support member being removed.

2. An insert rotary cutter according to claim 1, in which a section of said edge portion is rounded off to provide a rounded corner.

3. An insert rotary cutter according to claim 1, in which a section of said edge portion is chamfered to provide a chamfered corner.

* * * * *

UNITED STATES PATENT AND TRADEMARK OFFICE
CERTIFICATE OF CORRECTION

PATENT NO. : 4,687,383

DATED : August 18, 1987

INVENTOR(S) : Hiroshi SHIMOMURA; Tatsuo ARAI

It is certified that error appears in the above-identified patent and that said Letters Patent is hereby corrected as shown below:

```
         On the title page Priority Data should read
-- [30]    Foreign Application Priority Data Mar. 30, 1985 [JP]    Japan ............... 60-67203
    June  7, 1985 [JP]    Japan ................60-123894  --
```

Signed and Sealed this

First Day of March, 1988

*Attest:*

DONALD J. QUIGG

*Attesting Officer*    *Commissioner of Patents and Trademarks*